United States Patent
Kim et al.

(10) Patent No.: US 10,417,984 B2
(45) Date of Patent: *Sep. 17, 2019

(54) METHOD OF DRIVING ODD AND EVEN GATE LINES OF A DISPLAY PANEL, AND DISPLAY APPARATUS FOR PERFORMING THE SAME

(71) Applicant: Samsung Display Co., Ltd., Yongin-si, Gyeonggi-do (KR)

(72) Inventors: Jung-Won Kim, Seoul (KR); Joon-Chul Goh, Hwaseong-si (KR); Hong-Soo Kim, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 74 days.

This patent is subject to a terminal disclaimer.

(21) Appl. No.: 15/426,837

(22) Filed: Feb. 7, 2017

(65) Prior Publication Data
US 2017/0148412 A1 May 25, 2017

Related U.S. Application Data

(63) Continuation of application No. 14/510,953, filed on Oct. 9, 2014, now Pat. No. 9,589,525.

(30) Foreign Application Priority Data
Oct. 10, 2013 (KR) .................. 10-2013-0120856

(51) Int. Cl.
  *G09G 3/36* (2006.01)
  *G09G 3/296* (2013.01)
  (Continued)

(52) U.S. Cl.
  CPC .......... *G09G 3/3677* (2013.01); *G09G 3/296* (2013.01); *G09G 3/3648* (2013.01);
  (Continued)

(58) Field of Classification Search
  CPC .. G09G 3/3696; G09G 3/3677; G09G 3/3688; G09G 3/3648; G09G 3/3685;
  (Continued)

(56) References Cited

U.S. PATENT DOCUMENTS 7,812,911 B2 10/2010 Song
8,427,413 B2* 4/2013 Kitayama ............... G09G 3/36
                                                                345/100
(Continued)

FOREIGN PATENT DOCUMENTS

CN       1928981 A      3/2007
CN       101494020 A    7/2009
(Continued)

*Primary Examiner* — Darlene M Ritchie
(74) *Attorney, Agent, or Firm* — Lewis Roca Rothgerber Christie LLP (57) ABSTRACT

A method of driving a display panel is disclosed. In one aspect, the display panel includes a plurality of pixels arranged in odd and even rows and a plurality of odd and even gate lines respectively connected to the pixels of the corresponding odd and even rows. The method includes outputting odd gate signals to the odd numbered gate lines during two consecutive subframes and outputting even gate signals to the even numbered gate lines during two consecutive subframes. A frame is divided into two subframes.

21 Claims, 9 Drawing Sheets

(51) Int. Cl.
*G02F 1/1343* (2006.01)
*G02F 1/1362* (2006.01)

(52) U.S. Cl.
CPC ..... *G09G 3/3688* (2013.01); *G02F 1/134336* (2013.01); *G02F 1/136286* (2013.01); *G09G 3/3685* (2013.01); *G09G 3/3696* (2013.01); *G09G 2310/0224* (2013.01); *G09G 2310/0251* (2013.01); *G09G 2310/08* (2013.01); *G09G 2320/0261* (2013.01); *G09G 2320/0276* (2013.01); *G09G 2320/10* (2013.01)

(58) Field of Classification Search
CPC ....... G09G 2310/08; G09G 2310/0224; G09G 2310/0251; G09G 2320/0261; G09G 2320/10; G09G 2320/0276; G09G 3/296; G02F 1/134336; G02F 1/136286
See application file for complete search history.

(56) References Cited

U.S. PATENT DOCUMENTS

| | | | |
|---|---|---|---|
| 8,970,564 | B2 | 3/2015 | Moon et al. |
| 9,182,626 | B2 | 11/2015 | Kim |
| 2003/0179221 | A1 | 9/2003 | Nitta et al. |
| 2005/0093773 | A1* | 5/2005 | Kuroki ..................... G09G 3/20 345/30 |
| 2006/0097981 | A1* | 5/2006 | Park ..................... G09G 3/3677 345/102 |
| 2007/0035687 | A1 | 2/2007 | Oke et al. |
| 2007/0052658 | A1 | 3/2007 | Kim |
| 2007/0247478 | A1* | 10/2007 | Hagino ................ G09G 3/3614 345/698 |
| 2008/0012819 | A1* | 1/2008 | Lee ..................... G09G 3/3677 345/100 |
| 2008/0224980 | A1* | 9/2008 | Senda .................. G09G 3/3648 345/96 |
| 2009/0189881 | A1 | 7/2009 | Ooishi et al. |
| 2009/0231311 | A1* | 9/2009 | Shin ........................ G09G 3/20 345/205 |
| 2009/0278776 | A1* | 11/2009 | Pai ........................ G09G 3/3614 345/87 |
| 2010/0097366 | A1* | 4/2010 | Kitayama ............ G09G 3/3614 345/213 |
| 2010/0097367 | A1* | 4/2010 | Kitayama ............ G09G 3/3614 345/213 |
| 2010/0171725 | A1* | 7/2010 | Tsai ........................ G09G 3/20 345/205 |
| 2010/0207927 | A1* | 8/2010 | Joo ..................... G09G 3/3677 345/213 |
| 2010/0328198 | A1* | 12/2010 | Tsubata ................ G09G 3/3659 345/87 |
| 2011/0096062 | A1* | 4/2011 | Gondo ................ G09G 3/3614 345/212 |
| 2011/0102309 | A1 | 5/2011 | Cho |
| 2011/0157243 | A1* | 6/2011 | Chen ..................... G09G 3/3659 345/690 |
| 2011/0169793 | A1* | 7/2011 | Chen ..................... G09G 3/3677 345/205 |
| 2011/0298779 | A1* | 12/2011 | Chen ..................... G09G 3/344 345/212 |
| 2012/0154699 | A1* | 6/2012 | Yu ........................ G09G 3/3648 349/33 |
| 2013/0235006 | A1 | 9/2013 | Shin et al. |
| 2014/0168281 | A1 | 6/2014 | Ahn et al. |
| 2014/0340600 | A1* | 11/2014 | Yokonuma ........... G09G 3/3614 349/33 |

FOREIGN PATENT DOCUMENTS

| | | |
|---|---|---|
| CN | 101763837 A | 6/2010 |
| CN | 103165088 A | 6/2013 |
| JP | 11-102174 A | 4/1999 |
| JP | 2009-020197 A | 1/2009 |
| KR | 10-2012-0073793 A | 7/2012 |
| KR | 10-2013-0011265 A | 1/2013 |
| KR | 10-2013-0039271 A | 4/2013 |

* cited by examiner

| DV2 | R:0 | R:0 | R:0 | R:0 | R:0 | R:0 |
| DV3 | G:255 | G:255 | G:255 | G:255 | G:255 | G:255 |
| DV4 | B:255 | B:255 | B:255 | B:255 | B:255 | B:255 |

FIG. 5B

| DV2 | G:255 | G:255 | G:255 | G:255 | G:255 | G:255 |
| DV3 | B:255 | B:255 | B:255 | B:255 | B:255 | B:255 |
| DV4 | R:0 | R:0 | R:0 | R:0 | R:0 | R:0 |

METHOD OF DRIVING ODD AND EVEN GATE LINES OF A DISPLAY PANEL, AND DISPLAY APPARATUS FOR PERFORMING THE SAME

CROSS-REFERENCE TO RELATED APPLICATIONS

This application is a continuation of application Ser. No. 14/510,953, filed Oct. 9, 2014, which claims priority under 35 U.S.C. § 119 to Korean Patent Application No. 10-2013-0120856, filed on Oct. 10, 2013 in the Korean Intellectual Property Office KIPO, the contents of which are herein incorporated by reference in their entireties.

BACKGROUND

Field

The described technology generally relates to a method of driving a display panel and a display apparatus for performing the method.

Description of the Related Technology

Liquid crystal displays (LCDs) include a first substrate including a pixel electrode, a second substrate including a common electrode, and a liquid crystal layer interposed between the first and second substrates. An electric field is generated between the pixel electrode and the common electrode. The transmittance of light passing through the liquid crystal layer can be changed by adjusting the intensity of the electric field so that a desired image may be displayed.

SUMMARY OF CERTAIN INVENTIVE ASPECTS

One inventive aspect is a method of driving a display panel that can a sufficient charging rate for a data voltage and can prevent a horizontal line defect to improve the display quality of the display panel.

Another aspect is a method of driving a display apparatus including outputting an odd gate signal to odd numbered gate lines of a display panel during two consecutive subframes and outputting an even gate signal to even numbered gate lines of the display panel during two consecutive subframes. The display panel includes data lines alternately connected to pixels in a pixel column disposed on a first side with respect to the data line and a pixel column disposed on a second side with respect to the data line and gate lines crossing the data lines. A frame is divided into two subframes.

The odd gate signal may be output to the odd numbered gate lines during a first subframe of an N-th frame and a second subframe of an (N+1)-th frame. The even gate signal may be output to the even numbered gate lines during a second subframe of the N-th frame and a first subframe of the (N+1)-th frame. N is a natural number.

The outputting the odd gate signal to the odd numbered gate lines may include generating the odd gate signal based on a first vertical start signal. The outputting the even gate signal to the even numbered gate lines may include generating the even gate signal based on a second vertical start signal having a timing different from a timing of the first vertical start signal.

The second vertical start signal may be generated based on a last odd numbered gate signal.

The odd gate signals may be generated using the first vertical start signal, a first gate clock signal, and a second gate clock signal. A rising edge of the first gate clock signal may be overlapped with the first vertical start signal and a rising edge of the second gate clock signal may be overlapped with the first vertical start signal. The even gate signals may be generated using the second vertical start signal, a third gate clock signal, and a fourth gate clock signal. A rising edge of the third gate clock signal may be overlapped with the second vertical start signal and a rising edge of the fourth gate clock signal may be overlapped with the second vertical start signal.

The third gate clock signal may be the same as the first gate clock signal. The fourth gate clock signal may be the same as the second gate clock signal.

The pixel may be precharged by a pixel voltage of a second previous pixel in the same pixel column.

The method may further include dividing input image data into odd image data and even image, outputting an odd data voltage generated based on the odd image data to the data lines during a first subframe and outputting an even data voltage generated based on the even image data to the data lines during a second subframe.

The input image data may include odd image data rows and even image data rows which are alternated with each other.

The input image data may include the odd image data corresponding to an upper half portion and the even image data corresponding to a lower half portion.

Another aspect is a display apparatus including a display panel, a first gate, driver and a second gate driver. The display panel includes a plurality of gate lines, a plurality of data lines, and a plurality of pixels. The data line is alternately connected to pixels in a pixel column disposed on a first side with respect to the data line and a pixel column disposed on a second side with respect to the data line. The first gate driver outputs an odd gate signal to odd numbered gate lines during two consecutive subframes. A frame is divided into two subframes. The second gate driver outputs an even gate signal to even numbered gate lines during two consecutive subframes.

The first gate driver may output the odd gate signal to the odd numbered gate lines during a first subframe of an N-th frame and a second subframe of an (N+1)-th frame. The second gate driver may output the even gate signal to the even numbered gate lines during a second subframe of the N-th frame and a first subframe of the (N+1)-th frame. N is a natural number.

The first gate driver may generate the odd gate signal based on a first vertical start signal. The second gate driver may generate the even gate signal based on a second vertical start signal having a timing different of a timing of the first vertical start signal.

The second vertical start signal may be generated based on a last odd numbered gate signal.

The first gate driver may generate the odd gate signals using the first vertical start signal, a first gate clock signal and a second gate clock signal. A rising edge of the first gate clock signal may be overlapped with the first vertical start signal and a rising edge of the second gate clock signal may be overlapped with the first vertical start signal. The second gate driver may generate the even gate signals using the second vertical start signal, a third gate clock signal, and a fourth gate clock signal. A rising edge of the third gate clock signal may be overlapped with the second vertical start signal and a rising edge of the fourth gate clock signal may be overlapped with the second vertical start signal The third gate clock signal may be the same as the first gate clock signal. The fourth gate clock signal may be the same as the second gate clock signal.

The pixel may be precharged by a pixel voltage of a second previous pixel in the same pixel column.

The display apparatus may further include a set board and a timing controller. The set board may include an image providing part providing input image data. The timing controller may include an image dividing part receiving the input image data and dividing the input image data into odd image data and even image data and an image compensating part compensating the odd image data and the even image data to generate a data signal.

The image dividing part may include a half frame memory.

The display apparatus may further include a set board and a timing controller. The set board may include an image providing part providing input image data and an image dividing part receiving the input image data and dividing the input image data into odd image data and even image data. The timing controller may include an image compensating part compensating the odd image data and the even image data to generate a data signal.

According to at least one embodiment, the gate lines are divided into odd and even numbered gate lines to drive the display panel having a pixel such that the horizontal line defect may be prevented and the precharge amount is sufficient to prevent stains. In addition, odd gate voltages are applied to the gate lines during two consecutive frames and even gate voltages are applied to the gate lines during two consecutive frames so that a moving artifact may also be prevented. Thus, the display quality of the display panel may be improved.

DETAILED DESCRIPTION OF CERTAIN INVENTIVE EMBODIMENTS

A standard display includes a display panel and a panel driver. The display panel includes gate lines, data lines, and pixels connected to the gate lines and the data lines. The panel driver includes a gate driver that applies gate signals to the gate lines and a data driver that applies data voltages to the data lines.

Positive and negative voltages with respect to a common voltage can be alternately applied to the pixels of the display panel. When positive voltages are applied to every pixel during a first frame and negative voltages are applied to every pixel during a second frame, the positive and negative voltages corresponding to the same grayscale generate difference luminances in the pixels, resulting in a flicker.

The display panel can be driven with column inversion to prevent flicker. In this method, the positive and negative voltages are alternately applied to adjacent data lines. However, when a specific pattern included in an image is scrolled by one pixel for each frame in the column inversion method, vertical line defects can be manifested.

The display panel can also be driven with dot inversion to prevent vertical line defects. In the dot inversion method, the positive and negative voltages are alternately applied to adjacent data lines and each data line is alternately connected to pixels of neighboring columns. However, when the display panel displays an image having a mixed color, horizontal line defects may appear that result from the difference in the amount of precharge applied to the pixels in one row.

When the amount of precharge applied to a pixel increases to sufficiently charge the data voltage to the pixel, horizontal line defects may increase. When the amount of precharge applied to the pixel decreases to prevent these defects, a stain can result due to an insufficient charging rate of the data voltage applied to the pixel.

Hereinafter, the described technology will be explained in detail with reference to the accompanying drawings.

Figure 1:
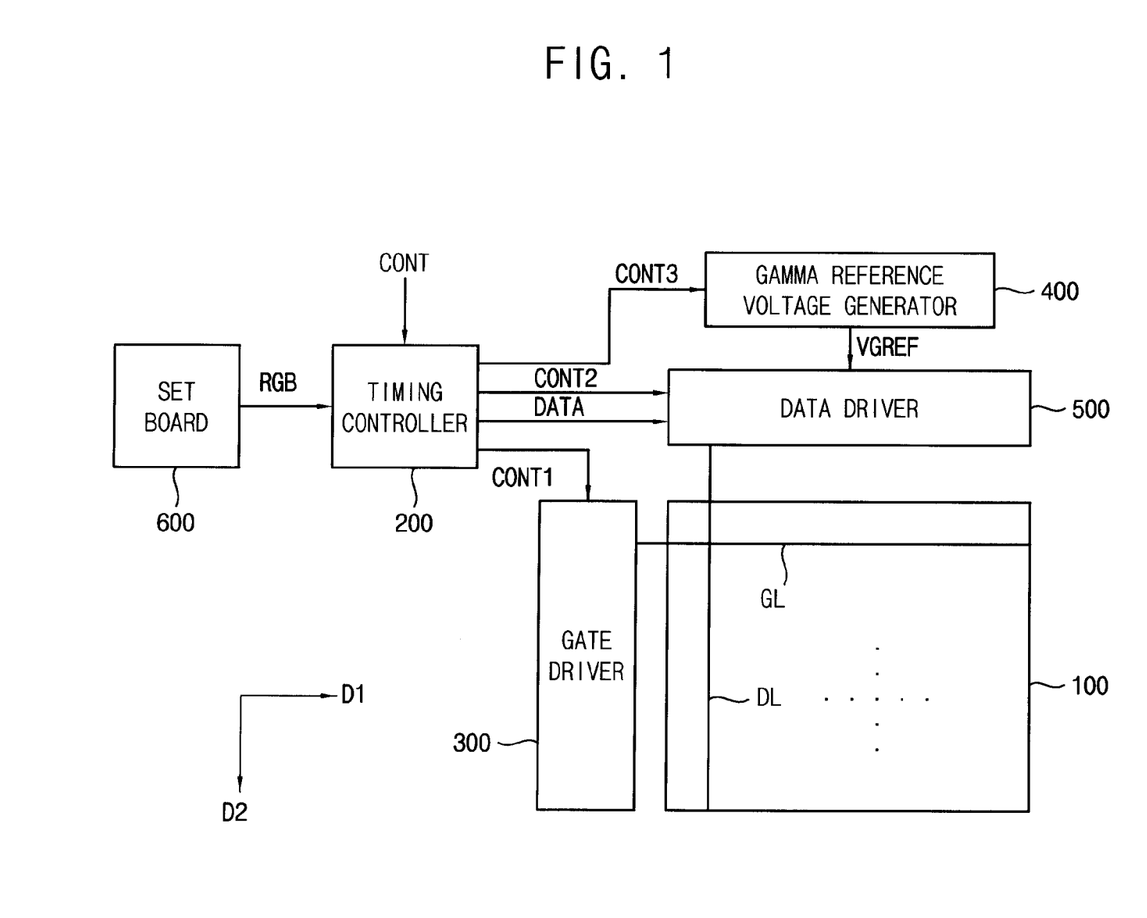
FIG. 1 is a block diagram illustrating a display apparatus according to an exemplary embodiment.

FIG. 1 is a block diagram illustrating a display apparatus according to an exemplary embodiment.

Referring to FIG. 1, the display apparatus includes a display panel 100, a panel driver, and a set board 600. The panel driver includes a timing controller 200, a gate driver 300, a gamma reference voltage generator 400, and a data driver 500.

The display panel 100 has a display region on which an image is displayed and a peripheral region adjacent to the display region.

The display panel 100 includes a plurality of gate lines GL, a plurality of data lines DL, and a plurality of unit pixels electrically connected to the gate lines GL and the data lines DL. The gate lines GL extend in a first direction D1 and the data lines DL extend in a second direction D2 crossing the first direction D1.

Each unit pixel may include a switching element (not shown), a liquid crystal capacitor (not shown), and a storage capacitor (not shown). The liquid crystal capacitor and the storage capacitor are electrically connected to the switching element. The unit pixels may be arranged in a matrix.

The pixel structure of the display panel 100 will be described in detail with reference to FIG. 2.

The timing controller 200 receives input image data RGB from the set board 600. The timing controller 200 receives an input control signal CONT from an external apparatus. The input image data may include red image data, green image data and blue image data. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3, and a data signal DATA based on the input image data RGB and the input control signal CONT.

The timing controller 200 generates the first control signal CONT1 for controlling the operation of the gate driver 300 based on the input control signal CONT and outputs the first control signal CONT1 to the gate driver 300. The first control signal CONT1 may include a vertical start signal and a gate clock signal.

The timing controller 200 generates the second control signal CONT2 for controlling the operation of the data driver 500 based on the input control signal CONT and outputs the second control signal CONT2 to the data driver 500. The second control signal CONT2 may include a horizontal start signal and a load signal.

The timing controller 200 generates the data signal DATA based on the input image data RGB. The timing controller 200 outputs the data signal DATA to the data driver 500. The timing controller 200 may also output the data signal DATA to the gate driver 500.

The timing controller 200 generates the third control signal CONT3 for controlling the operation of the gamma reference voltage generator 400 based on the input control signal CONT and outputs the third control signal CONT3 to the gamma reference voltage generator 400.

The structure of the timing controller 200 will be described in detail with reference to FIG. 6.

The gate driver 300 generates gate signals driving the gate lines GL in response to the first control signal CONT1 received from the timing controller 200. The gate driver 300 sequentially outputs the gate signals to the gate lines GL.

The gate driver 300 may be directly mounted on the display panel 100 or may be connected to the display panel 100 in a tape carrier package (TCP). Alternatively, the gate driver 300 may be integrated on the display panel 100.

The gate driver 300 divides the gate lines GL into odd and even numbered gate lines when driving the gate lines GL of the display panel 100.

The structure of the gate driver 300 will be described in detail with reference to FIG. 3.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to the level of the data signal DATA.

According to some embodiments, the gamma reference voltage generator 400 is included in the timing controller 200 or in the data driver 500.

The data driver 500 receives the second control signal CONT2 and the data signal DATA from the timing controller 200 and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

The data driver 500 outputs odd data voltages generated based on odd image data and even data voltages based on even image data to the data lines DL.

The data driver 500 may be directly mounted on the display panel 100 or may be connected to the display panel 100 in a TCP. Alternatively, the data driver 500 may be integrated on the display panel 100.

Figure 2:
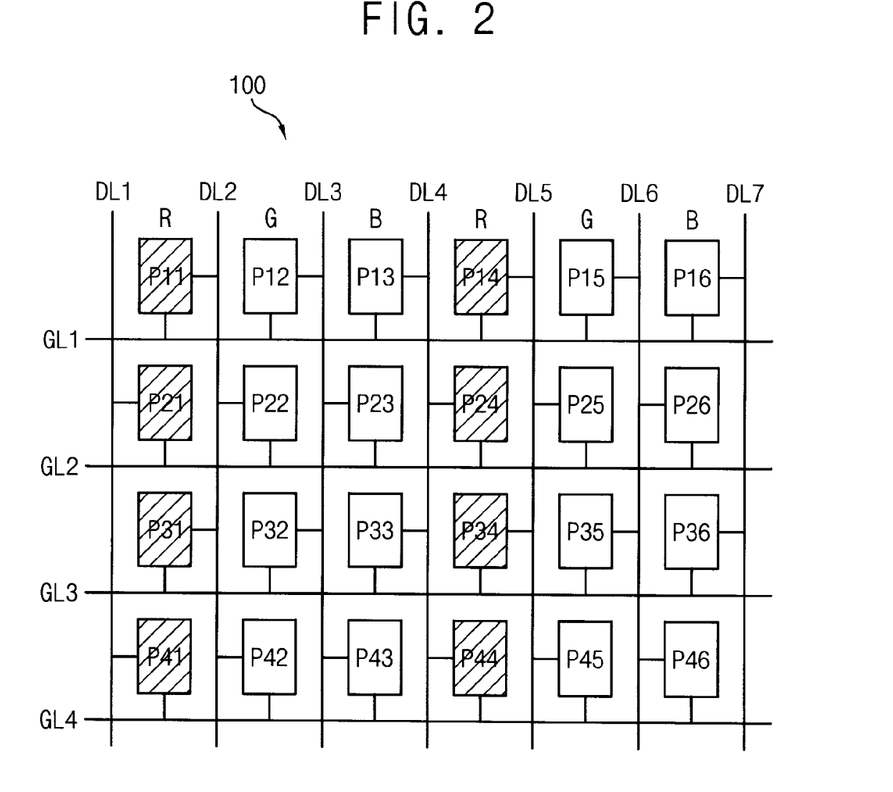
FIG. 2 is a plan view illustrating the pixel structure of the display panel of FIG. 1.

FIG. 2 is a plan view illustrating the pixel structure of the display panel 100 of FIG. 1.

Referring to FIGS. 1 and 2, the display panel 100 includes a plurality of pixels. The pixels form rows in the first direction D1 and columns in the second direction D2.

The gate lines GL are connected to pixels in a pixel row arranged on a first side with respect to the gate line GL. For example, a single gate line GL is connected to the pixels of a single pixel row.

The data lines DL are alternately connected to pixels in a pixel column arranged on a first side with respect to the data line DL and pixels in a pixel column arranged on a second side with respect to the data line DL.

In the embodiment shown in FIG. 2, a second data line DL2 is alternately connected to a first pixel P11 in a first pixel column, a second pixel P22 in a second pixel column, a third pixel P31 in the first pixel column, and a fourth pixel P42 in the second pixel column.

As shown in the embodiment of FIG. 2, a third data line DL3 is alternately connected to a first pixel P12 in the second pixel column, a second pixel P23 in a third pixel column, a third pixel P32 in the second pixel column, and a fourth pixel P43 in the third pixel column.

Further, in the embodiment of FIG. 2, a fourth data line DL4 is alternately connected to a first pixel P13 in the third pixel column, a second pixel P24 in a fourth pixel column, a third pixel P33 in the third pixel column, and a fourth pixel P44 in the fourth pixel column.

Data voltages having opposite polarities are applied to adjacent data lines. In addition, the polarities of the data voltages are inverted in every frame. For example, during a first frame, data voltages having a positive polarity (+) are applied to first, third, fifth, and seventh data lines DL1, DL3, DL5 and DL7 and data voltages having a negative polarity (−) are applied to second, fourth, sixth, and eighth data lines DL2, DL4, DL6 and DL8. During a second frame, data voltages having a negative polarity (−) are applied to the first, third, fifth, and seventh data lines DL1, DL3, DL5 and DL7 and data voltages having a positive polarity (+) are applied to the second, fourth, sixth, and eighth data lines DL2, DL4, DL6 and DL8.

Therefore, the pixels of the display panel 100 are inverted in every adjacent dot by the above column inversion method applied to the data lines DL.

In some embodiments, a first pixel column is a red pixel column R including red pixels. A second pixel column is a green pixel column G including green pixels. A third pixel column is a blue pixel column B including blue pixels. A fourth pixel column is a red pixel column R including red pixels. A fifth pixel column is a green pixel column G including green pixels. A sixth pixel column is a blue pixel column B including blue pixels.

Figure 3:
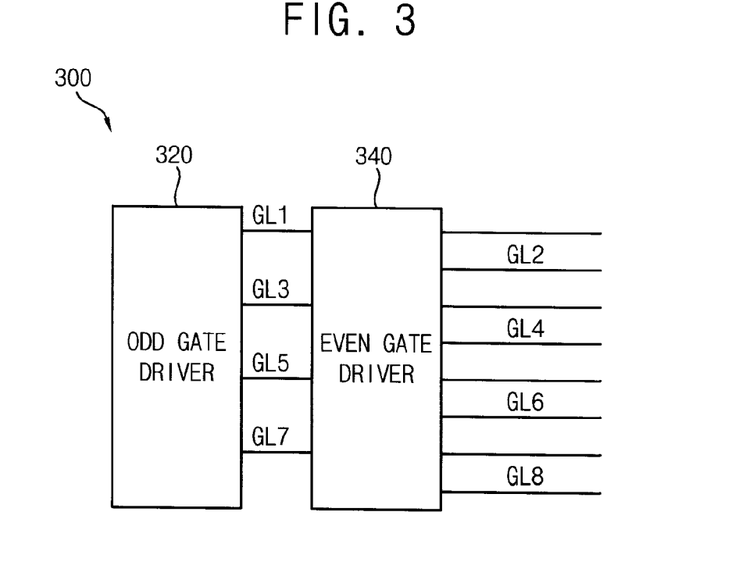
FIG. 3 is a block diagram illustrating the gate driver of FIG. 1.

Referring to FIGS. 1 to 5B, the gate driver 300 divides the odd and even numbered gate lines to drive the gate lines GL of the display panel 100. As shown in FIG. 3, the gate driver 300 includes a first gate driver 320 and a second gate driver 340. The first gate driver 320 is connected to the odd numbered gate lines GL1, GL3, GL5, and GL7 to output odd gate signals G1, G3, G5, and G7 to the corresponding odd numbered gate lines GL1, GL3, GL5, and GL7. The second gate driver 340 is connected to the even numbered gate lines GL2, GL4, GL6, and GL8 to output even gate signals G2, G4, G6, and G8 to the corresponding even numbered gate lines GL2, GL4, GL6, and GL8.

A single frame is divided into two sub frames. During a subframe, the odd gate signals G1, G3, G5, and G7 are output to the odd numbered gate lines GL1, GL3, GL5 and GL7. During the other subframe, the even gate signals G2, G4, G6, and G8 are output to the even numbered gate lines GL2, GL4, GL6, and GL8.

Figure 4:
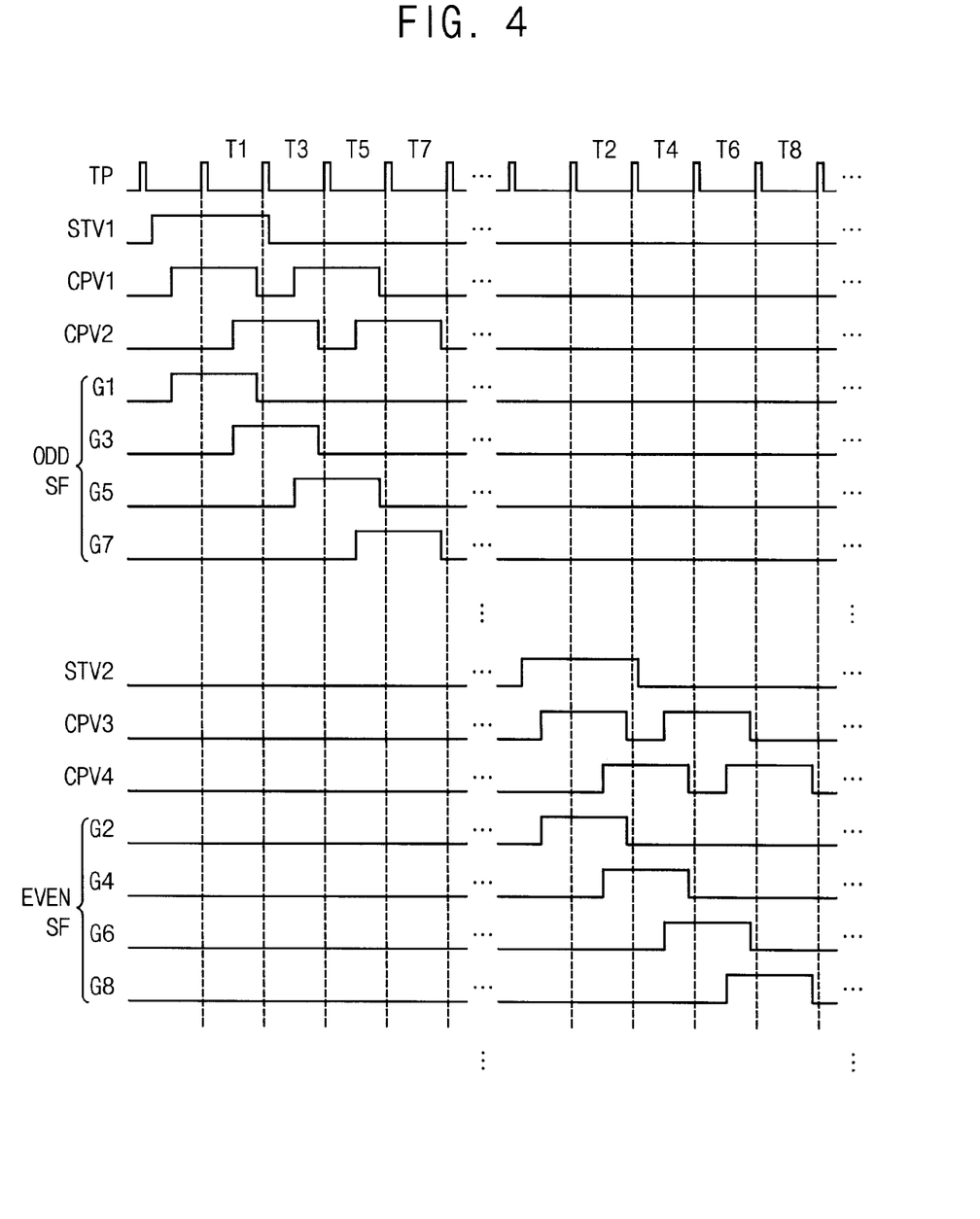
FIG. 4 is a timing diagram illustrating input and output signals of the gate driver of FIG. 1.

As shown in FIG. 4, the first gate driver 320 may generate the odd gate signals based on a first vertical start signal STV1 during an odd subframe. During an even subframe, the second gate driver 340 may generate the even gate signals based on a second vertical start signal STV2 having a different timing from that of the first vertical start signal STV1. Thus, the first and second vertical start signals STV1 and STV2 are generated during different subframes.

In some embodiments, the timing controller 2000 provides the first vertical start signal STV1 to the first gate driver 320 and the second vertical start signal STV2 to the second gate driver 340.

Alternatively, the second vertical start signal STV2 may be generated based on a last odd gate signal of the previous subframe. In these embodiments, the second vertical start signal STV2 is generated by OR operation of last two odd gate signals.

As shown in FIG. 4, the first gate driver 320 generates odd gate signals based on the first vertical start signal STV1, a first gate clock signal CPV1, and a second gate clock signal CPV2 during the odd subframe ODD SF. The rising edge of the first gate clock signal CPV1 overlaps the first vertical start signal STV1. The rising edge of the second gate clock signal CPV2 also overlaps the first vertical start signal STV1.

In the embodiment of FIG. 4, the first gate signal G1 applied to the first gate line GL1 is generated based on the first gate clock signal CPV1. The third gate signal G3 applied to the third gate line GL3 is generated based on the second gate clock signal CPV2. The fifth gate signal G5 applied to the fifth gate line GL5 is generated based on the first gate clock signal CPV1. The seventh gate signal G7 applied to the seventh gate line GL7 is generated based on the second gate clock signal CPV2.

In the embodiment of FIG. 4, the second gate driver 340 generates even gate signals based on the second vertical start signal STV2, a third gate clock signal CPV3, and a fourth gate clock signal CPV4 during the even subframe EVEN SF. The rising edge of the third gate clock signal CPV3 overlaps the second vertical start signal STV2. The rising edge of the second gate clock signal CPV4 overlaps the second vertical start signal STV2.

As shown in FIG. 4, the second gate signal G2 applied to the second gate line GL2 is generated based on the third gate clock signal CPV3. The fourth gate signal G4 applied to the fourth gate line GL4 is generated based on the fourth gate clock signal CPV4. The sixth gate signal G6 applied to the sixth gate line GL6 is generated based on the third gate clock signal CPV3. The eighth gate signal G8 applied to the eighth gate line GL8 is generated based on the fourth gate clock signal CPV4.

In some embodiments, the third gate clock signal CPV3 is the same as the first gate clock signal CPV1 and the fourth gate clock signal CPV4 is the same as the second gate clock signal CPV2.

During the odd subframe ODD SF, the first, third, fifth, and seventh gate signals G1, G3, G5, and G7 are output to the first, third, fifth, and seventh gate lines GL1, GL3, GL5, and GL7. In some embodiments, the first gate signal G1 is output to the first gate line GL1 in a first horizontal period T1. Similarly, the third gate signal G3 is output to the third gate line GL3 in a third horizontal period T3.

During the even subframe EVEN SF, the second, fourth, sixth, and eighth gate signals G2, G4, G6, and G8 are output to the second, fourth, sixth, and eighth gate lines GL2, GL4, GL6 and GL8. In some embodiments, the second gate signal G2 is output to the second gate line GL2 in a second horizontal period T2. Similarly, the fourth gate signal G4 is output to the fourth gate line GL4 in a fourth horizontal period T4.

The length of the high period of the gate signal may be longer than a length of the horizontal period between adjacent load signals TP. The pixels applied with the gate signals are driven in a precharge driving method. In some embodiments, a pixel is precharged using the pixel voltage of a previous pixel connected to the same data line in the same pixel column. The third gate signal G3 overlaps the first horizontal period T1 and the third horizontal period T3. Thus, the pixels connected to the third gate line GL3 are precharged using the pixel voltages of the pixels connected to the first gate line GL1. The fifth gate signal G5 overlaps the third horizontal period T3 and the fifth horizontal period T5. Thus, the pixels connected to the fifth gate line GL5 are precharged using pixel voltages of the pixels connected to the third gate line GL3.

When the red pixels have a zero grayscale value, the green pixels have a 255 grayscale value, and the blue pixels have a 255 grayscale value, a green pixel which is precharged by the pixel voltage of a red pixel and a green pixel precharged by the pixel voltage of a blue pixel have a luminance difference in a standard display apparatus which does not divide the gate lines into odd and even numbered gate lines to drive the gate lines. Thus, the standard display apparatus may generate a horizontal line defect.

Figure 5A:
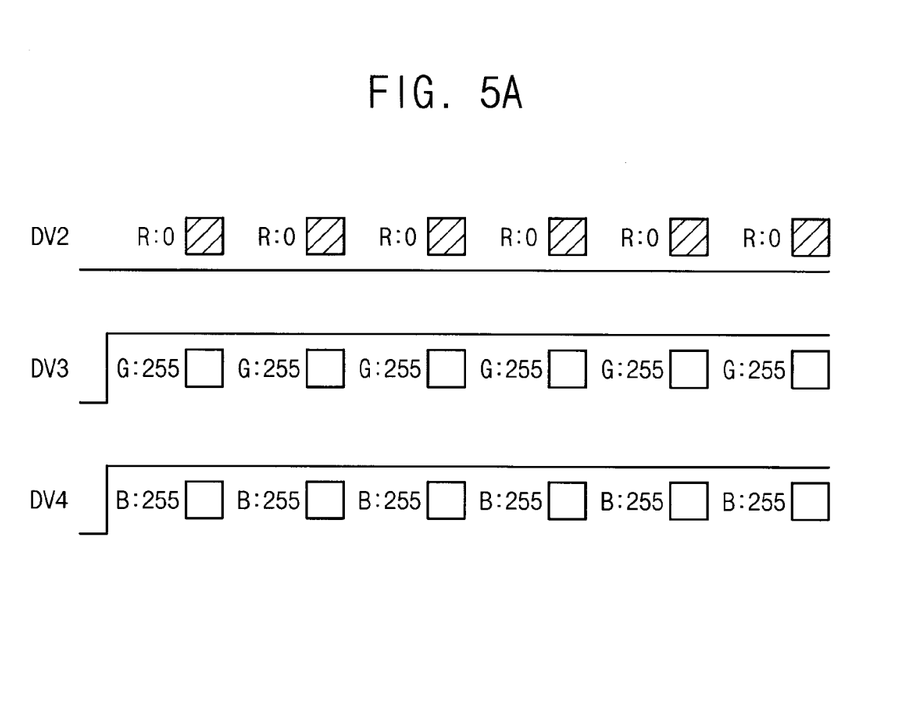
FIG. 5A is a conceptual diagram illustrating a precharge method of pixels connected to second to fourth data lines during a first frame.
Figure 5B:
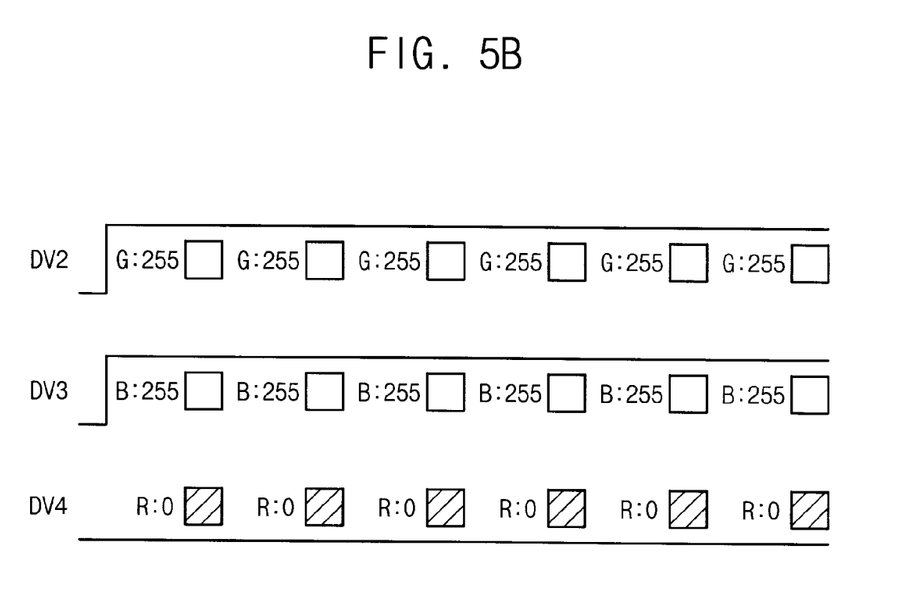
FIG. 5B is a conceptual diagram illustrating a precharge method of pixels connected to the second to fourth data lines during a second frame.

As shown in FIGS. 5A and 5B, when the red pixels have a zero grayscale value, the green pixels have a 255 grayscale value, and the blue pixels have a 255 grayscale value, the green pixels according to at least one embodiment are precharged by the pixel voltages of green pixels in the previous pixel row connected to the same data line and the same pixel column. Thus, the green pixels in the display panel 100 have substantially the same luminance so that the horizontal line defect may be prevented.

Although eight gate lines are illustrated in FIGS. 3 and 4, the described technology is not limited thereto.

Although each frame has been illustrated with an even subframe following an odd subframe in each frame, the order of the odd and even subframes may be switched. This will be described in detail referring to FIGS. 8 and 9.

Figure 6:
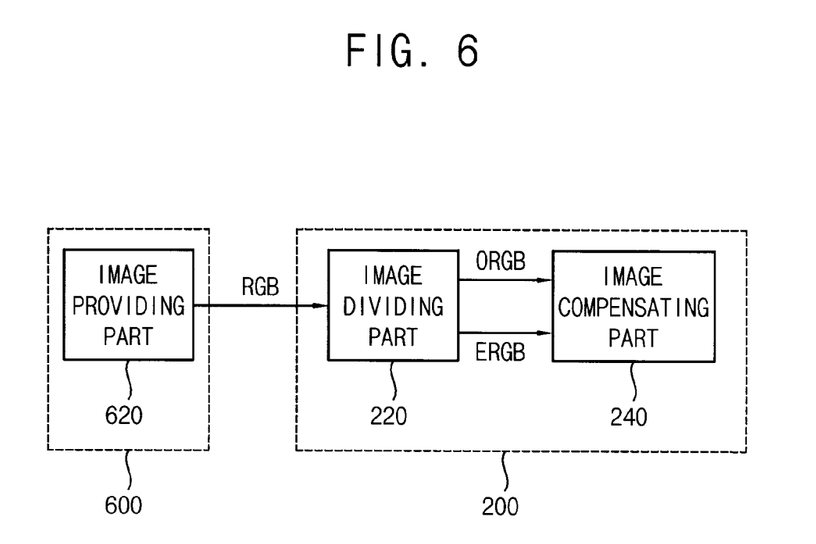
FIG. 6 is a block diagram illustrating the timing controller and the set board of FIG. 1.
Figure 7A:
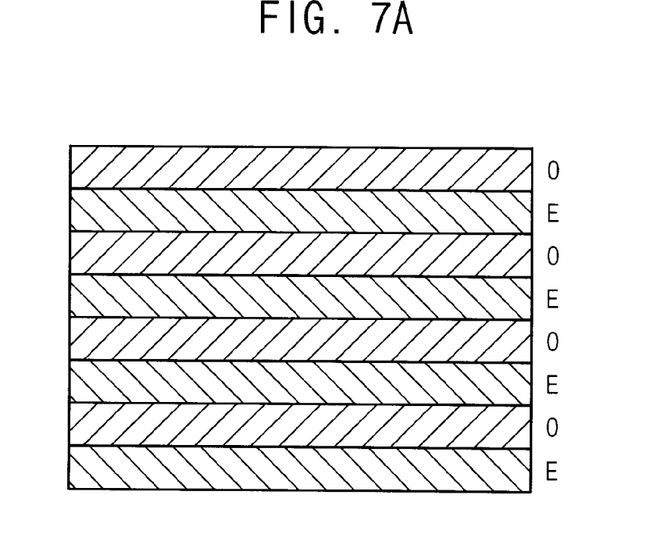
FIGS. 7A and 7B are conceptual diagrams illustrating input image data of FIG. 1.
Figure 7B:
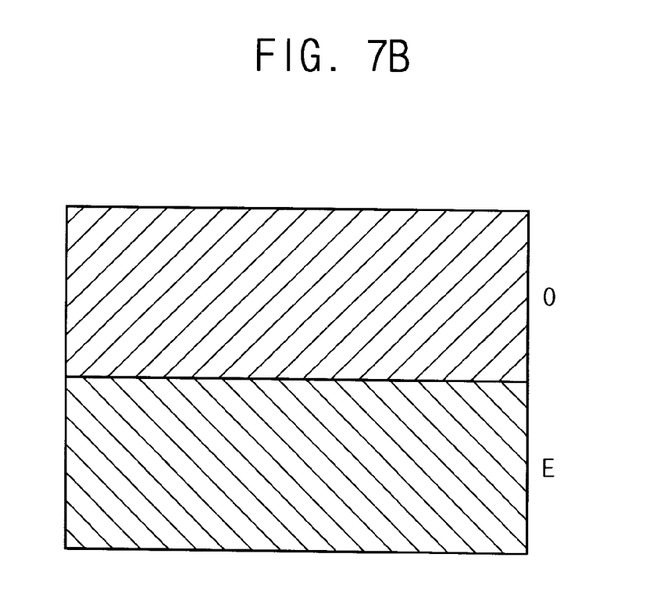

FIG. 6 is a block diagram illustrating the timing controller 200 and the set board 600 of FIG. 1. FIGS. 7A and 7B are conceptual diagrams illustrating the input image data RGB of FIG. 1.

Referring to FIGS. 1, 6, 7A, and 7B, the timing controller 200 includes an image dividing part or image divider 220 that divides the input image data RGB into odd image data ORGB and even image data ERGB.

The set board 600 includes an image providing part or image provider 620. The timing controller 200 includes the image dividing part 220 and an image compensating part or image compensator 240.

The image providing part 620 outputs the input image data RGB to the image dividing part 220.

The image dividing part 220 divides the input image data RGB into the odd image data ORGB and the even image data ERGB.

As shown in FIG. 7A, the input image data RGB includes alternating odd image data rows O and even image data rows E. The image dividing part 220 may collect data in the odd image data rows O to generate the odd image data ORGB and collect data in the even image data rows E to generate the even image data ERGB.

As shown in FIG. 7B, the input image data RGB includes odd image data O in the upper half and even image data E in the lower half. The image dividing part 220 may extract data from the upper half O and from the lower half E.

The image dividing part 220 may include a half frame memory to generate the odd and even image data ORGB and ERGB. The half frame memory temporally stores the even image data ERGB when outputting the odd image data ORGB. Alternatively, the image dividing part 220 may include a frame memory.

The image dividing part 220 outputs the odd image data ORGB and the even image data ERGB to the image compensating part 240.

The image compensating part 240 compensates the odd image data ORGB and the even image data ERGB to generate a data signal DATA. The image compensating part 240 compensates the odd image data ORGB and the even image data ERGB and generates an odd data signal and an even data signal.

The image compensating part 240 may include an adaptive color correcting part (not shown) and a dynamic capacitance compensating part (not shown).

The adaptive color correcting part receives the odd image data ORGB and the even image data ERGB and performs an adaptive color correction ("ACC"). The adaptive color correcting part may compensate the odd image data ORGB and the even image data ERGB using a gamma curve.

The dynamic capacitance compensating part performs a dynamic capacitance compensation ("DCC"), which compensates the grayscale data of present frame data using previous frame data and the present frame data.

In contrast to the embodiment of FIG. 6, the image compensating part 240 may be placed before the image dividing part 220.

The data driver 500 outputs the odd data voltages to the data lines DL based on the odd data signals during the odd subframe. The data driver 500 outputs the even data voltages to the data lines DL based on the even data signals during the even subframe.

Figure 8:
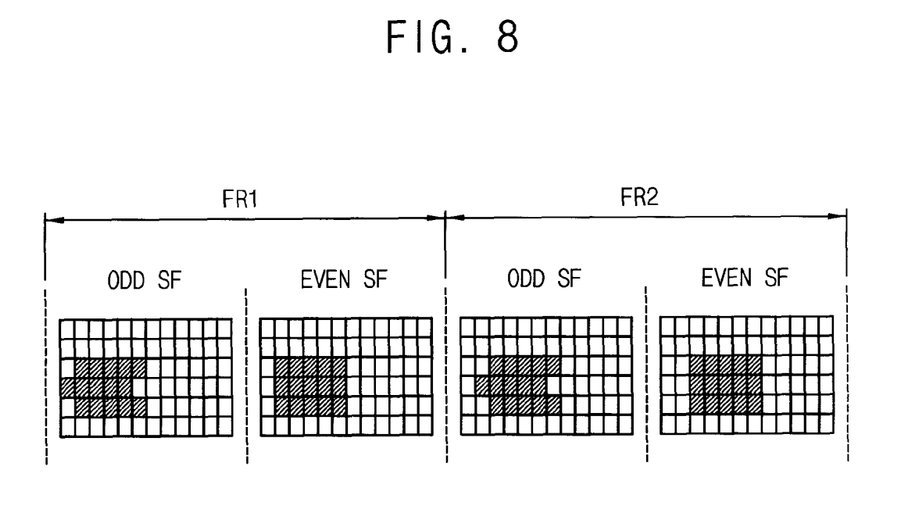
FIG. 8 is a conceptual diagram illustrating a moving artifact generated by a pattern scroll.
Figure 9:
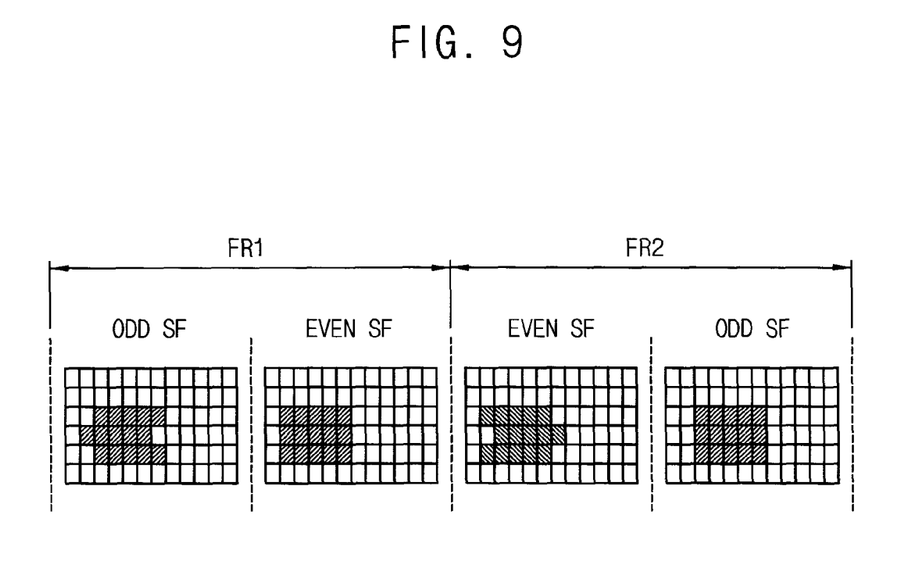
FIG. 9 is a conceptual diagram illustrating an image displayed on the display panel of FIG. 1 by the pattern scroll.

FIG. 8 is a conceptual diagram illustrating a moving artifact generated by a pattern scroll. FIG. 9 is a conceptual diagram illustrating an image displayed on the display panel 100 of FIG. 1 by the pattern scroll.

Hereinafter, a moving artifact due to pattern scroll is described with reference to FIGS. 1 to 9.

In FIG. 8, the first subframe of a first frame FR1 is an odd subframe ODD SF, the second subframe of the first frame FR1 is an even subframe EVEN SF, the first subframe of a second frame FR2 is an odd subframe ODD SF, and the second subframe of the second frame FR2 is an even subframe EVEN SF.

In FIG. 9, the first subframe of a first frame FR1 is an odd subframe ODD SF, the second subframe of the first frame FR1 is an even subframe EVEN SF, the first subframe of a second frame FR2 is an even subframe EVEN SF, and the second subframe of the second frame FR2 is an odd subframe ODD SF. In the embodiment of FIG. 9, the first gate driver 320 outputs odd gate signals to the odd numbered gate lines during two consecutive subframes ODD SF and ODD SF. The second gate driver 340 outputs even gate signals to the even numbered gate lines during two consecutive subframes EVEN SF and EVEN SF.

In FIGS. 8 and 9, a rectangular pattern moves in a horizontal direction by one pixel during a frame.

In the embodiment of FIG. 8, the first subframe of the first frame FR1 is an odd subframe ODD SF in which an image in third and fifth pixel rows moves in the horizontal direction by one pixel during the first subframe. Thus, the rectangular shape of the image is broken. The second subframe of the first frame FR1 is an even subframe EVEN SF in which the image in a fourth pixel row moves in the horizontal direction by one pixel during the second subframe. Thus, the rectangular shape of the image is recovered.

The eyes of an observer follow the boundary of the moving rectangular pattern. The broken rectangular pattern in the first subframe ODD SF of the first frame FR1 is the same as the broken rectangular pattern in the first subframe ODD SF of the second frame FR2 which may generate a moving artifact due to the line by line luminance difference at the boundary of the moving rectangular pattern. The moving artifact may be perceived as a horizontal line defect. As the distance of scroll of the pattern increases, the moving artifact may be more serious.

In the embodiment of FIG. 9, the first subframe of the first frame FR1 is an odd subframe ODD SF in which an image in third and fifth pixel rows moves in the horizontal direction by one pixel during the first subframe. Thus, the rectangular shape of the image is broken. The second subframe of the first frame FR1 is an even subframe EVEN SF in which the image in a fourth pixel row moves in the horizontal direction by one pixel during the second subframe. Thus, the rectangular shape of the image is recovered.

The first subframe of the second frame FR2 is an even subframe EVEN SF in which the image in the fourth pixel row moves in the horizontal direction by one pixel during the first subframe. Thus, the rectangular shape of the image is broken. The second subframe of the second frame FR2 is an odd subframe ODD SF in which the image in the third and fifth pixel rows moves in the horizontal direction by one pixel during the second subframe. Thus, the rectangular shape of the image is recovered.

The eyes of an observer follow the boundary of the moving rectangular pattern. The broken rectangular pattern in the first subframe ODD SF of the first frame FR1 is opposite to the broken rectangular pattern in the first subframe EVEN SF of the second frame FR2 so that the luminance difference at the boundary of the moving rectangular pattern may be compensated. Thus, the moving artifact due to the scroll of the pattern may be prevented.

In the embodiment of FIG. 9, a third frame FR3 sequentially includes an odd subframe ODD SF and an even subframe EVEN SF like the first frame FR1 and a fourth frame FR4 sequentially includes an even subframe EVEN SF and an odd subframe ODD SF like the second frame FR2.

In addition, the first frame FR1 may be generalized as an N-th frame and the second frame FR2 may be generalized as an (N+1)-th frame.

According to some embodiments, the gate lines are divided into odd and even numbered gate lines to drive the gate lines of the display panel 100 having a pixel configuration to prevent horizontal line defects from occurring. In addition, the odd gate signals are output to the odd numbered gate lines during two consecutive subframes and the even gate signals are output to the even numbered gate lines during another two consecutive subframes so that the moving artifact due to the pattern scroll may be prevented. Thus, the display quality of the display panel 100 may be improved.

Figure 10:
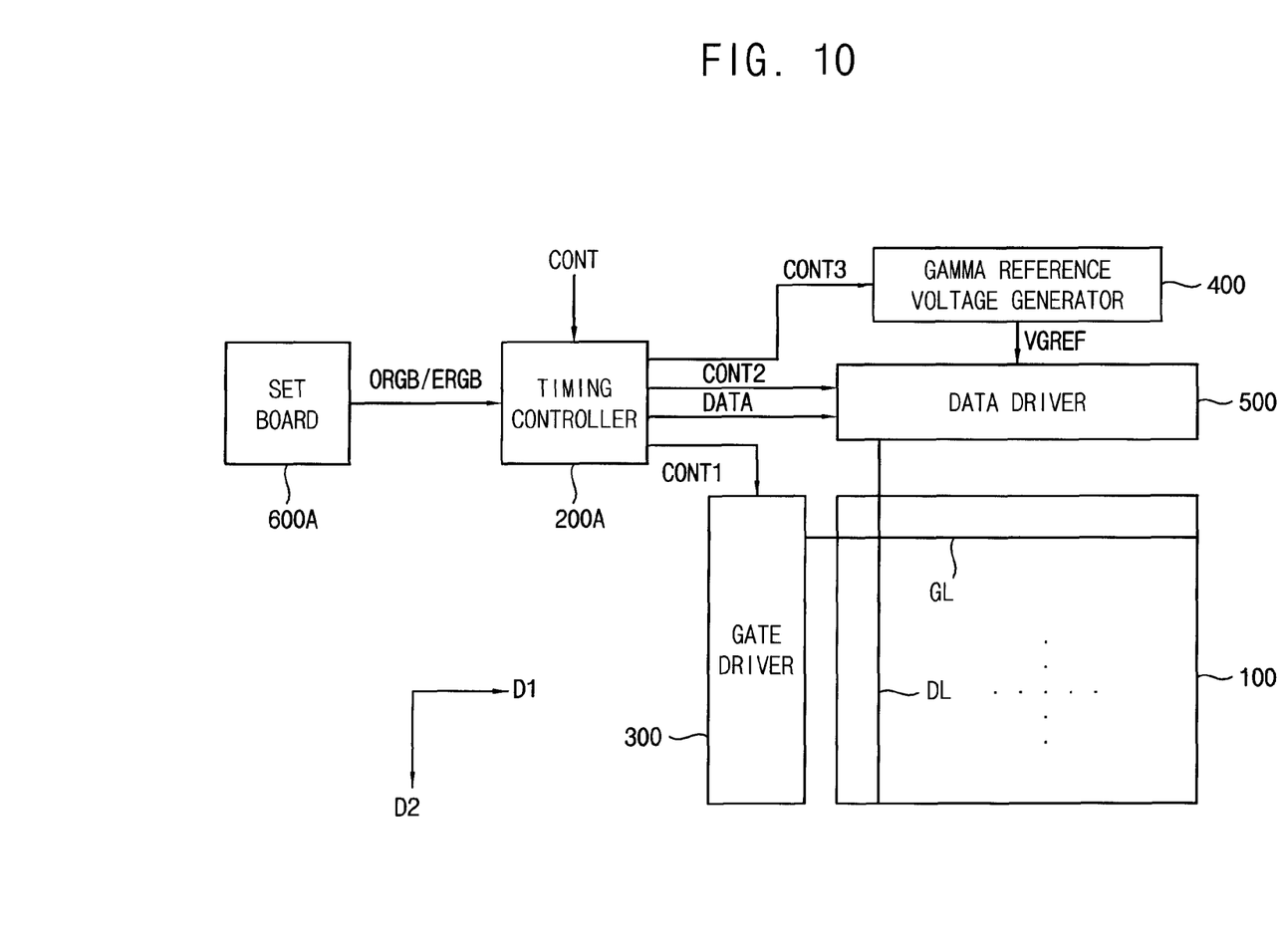
FIG. 10 is a block diagram illustrating a display apparatus according to an exemplary embodiment.
Figure 11:
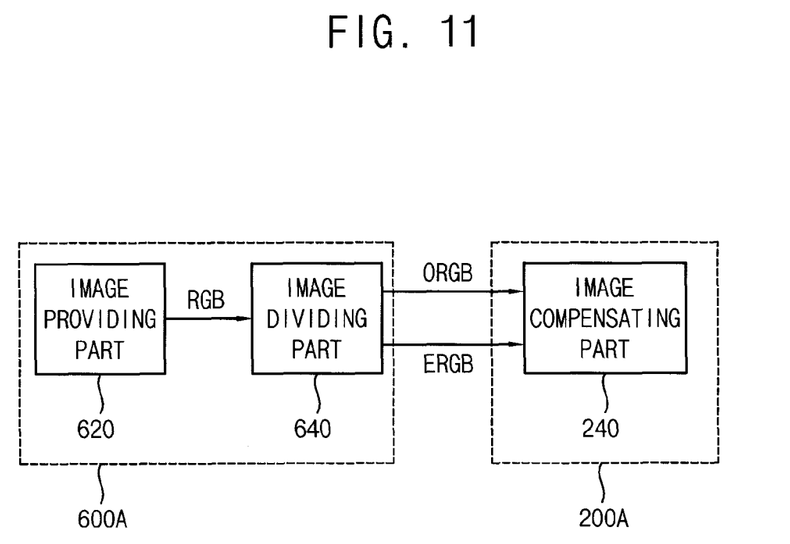
FIG. 11 is a block diagram illustrating the timing controller and the set board of FIG. 10.

FIG. 10 is a block diagram illustrating a display apparatus according to an exemplary embodiment. FIG. 11 is a block diagram illustrating the timing controller 200A and the set board 600A of FIG. 10.

The display apparatus of FIG. 10 is substantially the same as the display apparatus of the embodiment of FIGS. 1 to 9 except for the position of the image dividing part. Thus, the same reference numerals will be used to refer to the same or like parts as those described in the previous embodiment of FIGS. 1 to 9 and any repetitive explanation concerning the above elements will be omitted.

Referring to FIGS. 2 to 5B and 7 to 11, the display apparatus includes a display panel 100, a panel driver, and a set board 600A. The panel driver includes a timing controller 200A, a gate driver 300, a gamma reference voltage generator 400, and a data driver 500.

The display panel 100 includes a plurality of gate lines GL, a plurality of data lines DL, and a plurality of unit pixels electrically connected to the gate lines GL and the data lines DL. The gate lines GL extend in a first direction D1 and the data lines DL extend in a second direction D2 crossing the first direction D1.

The timing controller 200A receives odd image data ORGB and even image data ERGB from the set board 600A. The timing controller 200A receives an input control signal CONT from an external apparatus.

The timing controller 200A generates a first control signal CONT1, a second control signal CONT2, a third control signal CONT3, and a data signal DATA based on the odd image data ORGB, the even image data ERGB, and the input control signal CONT.

The gate driver 300 generates gate signals driving the gate lines GL in response to the first control signal CONT1 received from the timing controller 200A. The gate driver 300 sequentially outputs the gate signals to the gate lines GL.

The gate driver 300 divides the gate lines into odd and even numbered gate lines to drive the gate lines GL of the display panel 100. The gate driver 300 includes a first gate driver 320 and a second gate driver 340. The first gate driver 320 is connected to the odd numbered gate lines GL1, GL3, GL5, and GL7 to output odd gate signals G1, G3, G5, and G7 to the odd numbered gate lines GL1, GL3, GL5, and GL7. The second gate driver 340 is connected to the even numbered gate lines GL2, GL4, GL6, and GL8 to output even gate signals G2, G4, G6, and G8 to the even numbered gate lines GL2, GL4, GL6, and GL8.

A single frame is divided into two sub frames. During a subframe, the odd gate signals G1, G3, G5, and G7 are output to the odd numbered gate lines GL1, GL3, GL5, and GL7. During the other subframe, the even gate signals G2, G4, G6, and G8 are output to the even numbered gate lines GL2, GL4, GL6, and GL8.

The gamma reference voltage generator 400 generates a gamma reference voltage VGREF in response to the third control signal CONT3 received from the timing controller 200A.

The data driver 500 receives the second control signal CONT2 and the data signal DATA from the timing controller 200A and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

The data driver 500 outputs odd data voltages generated based on odd image data and even data voltages based on even image data to the data lines DL.

The set board 600A includes an image dividing part 640 dividing the input image data RGB into odd image data ORGB and even image data ERGB.

The set board 600A includes an image providing part 620 and the image dividing part 640. The timing controller 200A includes an image compensating part 240.

The image providing part 620 outputs the input image data RGB to the image dividing part 640.

The image dividing part 640 divides the input image data RGB into the odd image data ORGB and the even image data ERGB.

As shown in FIG. 7A, the input image data RGB includes alternating odd image data rows O and even image data rows E. The image dividing part 640 collects data in the odd image data rows O to generate the odd image data ORGB and collects data in the even image data rows E to generate the even image data ERGB.

As shown in FIG. 7B, the input image data RGB includes odd image data O corresponding to an upper half and even image data E corresponding to a lower half. The image dividing part 640 extracts data in the upper half O and extracts data in the lower half E.

The image dividing part 640 outputs the odd image data ORGB and the even image data ERGB to the image compensating part 240.

The image compensating part 240 compensates the odd image data ORGB and the even image data ERGB to generate a data signal DATA. In some embodiments, the image compensating part 240 compensates the odd image data ORGB and the even image data ERGB and generates an odd data signal and an even data signal.

The data driver 500 outputs the odd data voltages to the data lines DL based on the odd data signals during the odd subframe. The data driver 500 outputs the even data voltages to the data lines DL based on the even data signals during the even subframe.

According to the embodiment of FIGS. 10 and 11, the gate lines are divided into odd and even numbered gate lines to drive the gate lines of the display panel 100 having a pixel configuration to prevent horizontal line defects from occurring. In addition, the odd gate signals are output to the odd numbered gate lines during two consecutive subframes and the even gate signals are output to the even numbered gate lines during another two consecutive subframes so that the moving artifact due to the pattern scroll may be prevented. Thus, the display quality of the display panel 100 can be improved.

According to at least one embodiment as explained above, the charging rate of the pixels of the display panel may be sufficient, a horizontal line defect may be prevented, and the moving artifact may be prevented. Thus, the display quality of the display panel may be improved.

The foregoing is illustrative of the described technology and is not to be construed as limiting thereof. Although a few exemplary embodiments of the described technology have been described, those skilled in the art will readily appreciate that many modifications are possible in the exemplary embodiments without materially departing from the novel teachings and advantages of the described technology. Accordingly, all such modifications are intended to be included within the scope of the described technology as defined in the claims. In the claims, means-plus-function clauses are intended to cover the structures described herein as performing the recited function and not only structural equivalents but also equivalent structures. Therefore, it is to be understood that the foregoing is illustrative of the described technology and is not to be construed as limited to the specific exemplary embodiments disclosed, and that modifications to the disclosed exemplary embodiments, as well as other exemplary embodiments, are intended to be included within the scope of the appended claims. The described technology is defined by the following claims, with equivalents of the claims to be included therein.

What is claimed is:

1. A method of driving a display panel including a plurality of pixels arranged in alternating odd and even rows and a plurality of alternating odd and even gate lines respectively connected to the pixels of the corresponding odd and even rows, the method comprising:
   outputting odd gate signals to all of the odd gate lines during each of two consecutive odd gate signal subframes, wherein a frame is divided into two subframes such that each odd gate line is scanned twice with no even gate line scanning in between the two consecutive odd gate signal subframes; and
   outputting even gate signals to all of the even gate lines during each of two consecutive even gate signal subframes such that each even gate line is scanned twice with no odd gate line scanning in between the two consecutive even gate signal subframes,
   wherein, during each subframe, only odd gate signals or only even gate signals are applied to the respective gate lines,
   wherein the odd gate signals are output to the odd gate lines during a first subframe of an N-th frame and a second subframe of an (N+1)-th frame, wherein the even gate signals are output to the even gate lines during a second subframe of the N-th frame and a first subframe of the (N+1)-th frame, and wherein N is a natural number.

2. The method of claim 1, wherein the pixels are further arranged in a plurality of columns, wherein the display panel further comprises a plurality of data lines alternately connected to the pixels of neighboring columns, and wherein the method further comprises precharging each of the pixels by a pixel voltage of a previous pixel connected to the same data line in the same pixel column.

3. The method of claim 1, wherein the outputting of the odd gate signals comprises generating the odd gate signals based at least in part on a first vertical start signal,
   wherein the outputting of the even gate signals comprises generating the even gate signals based at least in part on a second vertical start signal, and
   wherein the first and second vertical start signals are generated during different subframes.

4. The method of claim 3, wherein the second vertical start signal is generated based at least in part on a last odd gate signal of a previous subframe.

5. The method of claim 3, wherein the odd gate signals are generated based at least in part on the first vertical start signal, a first gate clock signal, and a second gate clock signal,
   wherein a rising edge of the first gate clock signal at least partially overlaps the first vertical start signal,
   wherein a rising edge of the second gate clock signal overlaps the first vertical start signal,
   wherein the even gate signals are generated based at least in part on the second vertical start signal, a third gate clock signal, and a fourth gate clock signal,
   wherein a rising edge of the third gate clock signal at least partially overlaps the second vertical start signal, and wherein a rising edge of the fourth gate clock signal at least partially overlaps the second vertical start signal.

6. The method of claim 5, wherein the third gate clock signal is the same as the first gate clock signal and wherein the fourth gate clock signal is the same as the second gate clock signal.

7. The method of claim 1, further comprising:
   receiving input image data;
   dividing the input image data into odd image data and even image data;
   generating odd data voltages based at least in part on the odd image data;
   outputting the odd data voltages to data lines;
   generating even data voltages based at least in part on the even image data; and
   outputting the even data voltages to the data lines.

8. The method of claim 7, wherein the input image data includes alternating odd and even image data rows.

9. The method of claim 7, wherein the input image data includes the odd image data in a first half thereof and the even image data in a second half thereof.

10. A display apparatus, comprising:
    a display panel comprising a plurality of alternating odd and even gate lines, a plurality of data lines, and a plurality of pixels arranged in alternating odd and even rows and in a plurality of columns, wherein the odd and even gate lines are respectively connected to the pixels of the corresponding odd and even rows, and wherein the data lines are alternately connected to the pixels of neighboring columns;
    a first gate driver configured to output odd gate signals to all of the odd gate lines during each of two consecutive odd gate signal subframes, wherein a frame is divided into two subframes such that each odd gate line is scanned twice with no even gate line scanning in between the two consecutive odd gate signal subframes; and
    a second gate driver configured to output even gate signals to all of the even gate lines during each of two consecutive even gate signal subframes such that each even gate line is scanned twice with no odd gate line scanning in between the two consecutive even gate signal subframes,
    wherein, during each subframe, only odd gate signals or only even gate signals are applied to the respective gate lines,
    wherein the first gate driver is further configured to output the odd gate signals to the odd gate lines during a first subframe of an N-th frame and a second subframe of an (N+1)-th frame, wherein the second gate driver is further configured to output the even gate signals to the even gate lines during a second subframe of the N-th frame and a first subframe of the (N+1)-th frame, and wherein N is a natural number.

11. The display apparatus of claim 10, further comprising:
    an image provider configured to output input image data;
    an image divider configured to i) receive the input image data, ii) divide the input image data into odd image data and even image data and iii) output the odd and even image data; and
    an image compensator configured to i) receive the odd and even image data and ii) compensate the odd image data and the even image data to generate a data signal.

12. The display apparatus of claim 10, further comprising a timing controller configured to respectively apply first and second vertical start signals to the first and second gate drivers, wherein the first gate driver is further configured to generate the odd gate signals based at least in part on the first vertical start signal, wherein the second gate driver is further configured to generate the even gate signals based at least in part on the second vertical start signal, and wherein the timing controller is further configured to generate the first and second vertical start signals during different subframes.

13. The display apparatus of claim 12, wherein the second vertical start signal is generated based at least in part on a last odd gate signal of a previous subframe.

14. The display apparatus of claim 10, further comprising:

an image provider configured to output input image data; and a timing controller comprising an image divider configured to i) receive the input image data from the image provider and ii) divide the input image data into odd image data and even image data, wherein the timing controller further comprises an image compensator configured to compensate the odd image data and the even image data to generate a data signal.

15. The display apparatus of claim 14, wherein the image divider includes a half frame memory.

16. A display apparatus, comprising:

a display panel comprising a plurality of alternating odd and even gate lines, a plurality of data lines, and a plurality of pixels arranged in alternating odd and even rows and a plurality of columns, wherein the odd and even gate lines are respectively connected to the pixels of the corresponding odd and even rows;

a first gate driver configured to output odd gate signals to all of the odd gate lines during each of two consecutive odd gate signal subframes, wherein a frame is divided into an odd gate signal subframe and an even gate signal subframe, such that each odd gate line is scanned twice with no even gate line scanning in between the two consecutive odd gate signal subframes; and a second gate driver configured to output even gate signals to all of the even gate lines during each of two consecutive even gate signal subframes such that each even gate line is scanned twice with no odd gate line scanning in between the two consecutive even gate signal subframes, wherein, during each frame, the first and second gate drivers are configured to apply the odd gate signals and the even gate signals to all of the odd gate lines and the even gate lines, wherein, during the odd gate signal subframe, the first gate driver is configured to apply only the odd gate signals to the odd gate lines, wherein, during the even gate signal subframe, the second gate driver is configured to apply only the even gate signals to the even gate lines, wherein the first gate driver is further configured to output the odd gate signals to the odd gate lines during a first subframe of an N-th frame and a second subframe of an (N+1)-th frame, wherein the second gate driver is further configured to output the even gate signals to the even gate lines during a second subframe of the N-th frame and a first subframe of the (N+1)-th frame, and wherein N is a natural number.

17. The display apparatus of claim 16, further comprising:

an image provider configured to output input image data;

an image divider configured to i) receive the input image data, ii) divide the input image data into odd image data and even image data and iii) output the odd and even image data; and an image compensator configured to i) receive the odd and even image data and ii) compensate the odd image data and the even image data to generate a data signal.

18. The display apparatus of claim 16, further comprising a timing controller configured to respectively apply first and second vertical start signals to the first and second gate drivers, wherein the first gate driver is further configured to generate the odd gate signals based at least in part on the first vertical start signal, wherein the second gate driver is further configured to generate the even gate signals based at least in part on the second vertical start signal, and wherein the timing controller is further configured to generate the first and second vertical start signals during different subframes.

19. The display apparatus of claim 18, wherein the second vertical start signal is generated based at least in part on a last odd gate signal of a previous subframe.

20. The display apparatus of claim 16, further comprising:

an image provider configured to output input image data; and a timing controller comprising an image divider configured to i) receive the input image data from the image provider and ii) divide the input image data into odd image data and even image data, wherein the timing controller further comprises an image compensator configured to compensate the odd image data and the even image data to generate a data signal.

21. The display apparatus of claim 20, wherein the image divider includes a half frame memory.

* * * * *